United States Patent
Flötotto et al.

(10) Patent No.: US 9,367,889 B2
(45) Date of Patent: Jun. 14, 2016

(54) SYSTEM AND METHOD FOR PROPAGATING SCENE INFORMATION TO RENDERERS IN A MULTI-USER, MULTI-SCENE ENVIRONMENT

(71) Applicant: Nvidia Corporation, Santa Clara, CA (US)

(72) Inventors: Julia Flötotto, Berlin (DE); Stefan Radig, Berlin (DE)

(73) Assignee: NVIDIA CORPORATION, Santa Clara, CA (US)

( * ) Notice: Subject to any disclaimer, the term of this patent is extended or adjusted under 35 U.S.C. 154(b) by 330 days.

(21) Appl. No.: 13/851,136

(22) Filed: Mar. 27, 2013

(65) Prior Publication Data

US 2014/0292781 A1 Oct. 2, 2014

(51) Int. Cl.
*G06T 1/20* (2006.01)

(52) U.S. Cl.
CPC .......................................... *G06T 1/20* (2013.01)

(58) Field of Classification Search
CPC ................................ G06T 1/20; G06T 15/005
See application file for complete search history.

(56) References Cited

U.S. PATENT DOCUMENTS

2008/0266302 A1* 10/2008 Andre et al. ................... 345/519
2012/0290867 A1* 11/2012 Zhang et al. ....................... 714/1

OTHER PUBLICATIONS

Su et al., "Cost-Concious Scheduling for Large Graph Processing in the Cloud," IEEE., 2011.*
Parker et al., "Optix: A General Purpose Ray Tracing Engine," ACM, Jul. 2010.*
Reiners et al. ("OpenSG—An OpenSource Scenegraph," version 0.2 alpha, May 5, 2000, http://www.labri.fr/perso/preuter/imageSynthesis/sceneGraphs/opensg_design.html, retrieved Apr. 22, 2015.*
Roth et al., "Multi-Threading and Clustering for Scene Graph Systems," Oct. 2003, Computer Graphics Center, Elsevier Science.*

* cited by examiner

*Primary Examiner* — Kee M Tung
*Assistant Examiner* — Nicholas R Wilson

(57) ABSTRACT

A system and method for propagating scene information to a renderer. In one embodiment, the system includes: (1) an update request receiver operable to receive an update request from the renderer and determine a point from which the renderer is to be updated and (2) an update propagator associated with the update request receiver and operable to employ a graph containing scene information to construct a change list corresponding to the update request and transmit the change list toward the renderer.

20 Claims, 2 Drawing Sheets

SYSTEM AND METHOD FOR PROPAGATING SCENE INFORMATION TO RENDERERS IN A MULTI-USER, MULTI-SCENE ENVIRONMENT

TECHNICAL FIELD

This application is directed, in general, to computer systems and, more specifically, to computer systems that perform rendering functions for multi-user, multi-scene environments.

BACKGROUND

The utility of personal computing was originally focused at an enterprise level, putting powerful tools on the desktops of researchers, engineers, analysts and typists. That utility has evolved from mere number-crunching and word processing to highly programmable, interactive workpieces capable of production level and real-time graphics rendering for incredibly detailed computer aided design, drafting and visualization. Personal computing has more recently evolved into a key role as a media and gaming outlet, fueled by the development of mobile computing. Personal computing is no longer resigned to the world's desktops, or even laptops. Robust networks and the miniaturization of computing power have enabled mobile devices, such as cellular phones and tablet computers, to carve large swaths out of the personal computing market. Desktop computers remain the highest performing personal computers available and are suitable for traditional businesses, individuals and gamers. However, as the utility of personal computing shifts from pure productivity to envelope media dissemination and gaming, and, more importantly, as media streaming and gaming form the leading edge of personal computing technology, a dichotomy develops between the processing demands for "everyday" computing and those for high-end gaming, or, more generally, for high-end graphics rendering in a multi-user, multi-scene environment.

The processing demands for high-end graphics rendering drive development of specialized hardware, such as graphics processing units (GPUs) and graphics processing systems (graphics cards). For many users, high-end graphics hardware would constitute a gross under-utilization of processing power. The rendering bandwidth of high-end graphics hardware is simply lost on traditional productivity applications and media streaming. Cloud graphics processing is a centralization of graphics rendering resources aimed at overcoming the developing misallocation.

In cloud architectures, similar to conventional media streaming, graphics content is stored, retrieved and rendered on a server where it is then encoded, packetized and transmitted over a network to a client associated with a user as a video stream (often including audio). The client simply decodes the video stream and displays the content. High-end graphics hardware is thereby obviated on the client end, which requires only the ability to play video. Graphics processing servers centralize high-end graphics hardware, enabling the pooling of graphics rendering resources where they can be allocated appropriately upon demand. Furthermore, cloud architectures pool storage, security and maintenance resources, which provide users easier access to more up-to-date content than can be had on traditional personal computers.

Perhaps the most compelling aspect of cloud architectures is the inherent cross-platform compatibility. The corollary to centralizing graphics processing is offloading large complex rendering tasks from client platforms. Graphics rendering is often carried out on specialized hardware executing proprietary procedures that are optimized for specific platforms running specific operating systems. Cloud architectures need only a thin-client application that can be easily portable to a variety of client platforms. This flexibility on the client side lends itself to content and service providers who can now reach the complete spectrum of personal computing consumers operating under a variety of hardware and network conditions.

SUMMARY

One aspect provides a system for propagating scene information to renderers in a multi-user, multi-scene environment. In one embodiment, the system includes: (1) an update request receiver operable to receive an update request from the renderer and determine a point from which the renderer is to be updated and (2) an update propagator associated with the update request receiver and operable to employ a graph containing scene information to construct a change list corresponding to the update request and transmit the change list toward the renderer.

Another aspect provides a method of propagating scene information to a renderer in a multi-user, multi-scene environment. In one embodiment, the method includes: (1) receiving an update request from a renderer associated with a virtual machine, (2) determining a point from which the renderer is to be updated, (3) constructing a change list corresponding to the update request employing a graph containing scene information and (4) transmitting the change list to allow the renderer to update a local version of the graph.

Yet another aspect provides a multi-user, multi-scene environment. In one embodiment, the environment includes: (1) a database operable to store a master Directed Acyclic Graph (DAG) containing scene information, (2) a plurality of renderers operable to render video streams using respective local versions of the master DAG, (3) an update request receiver associated with the database and operable to receive update requests from the renderers and determine points from which the respective local versions of the master DAG are to be updated and (4) an update propagator associated with the update request receiver and operable to employ the master DAG to construct change lists corresponding to the update requests and transmit the change lists to the renderers.

BRIEF DESCRIPTION

Reference is now made to the following descriptions taken in conjunction with the accompanying drawings, in which.

DETAILED DESCRIPTION

Figure 1:
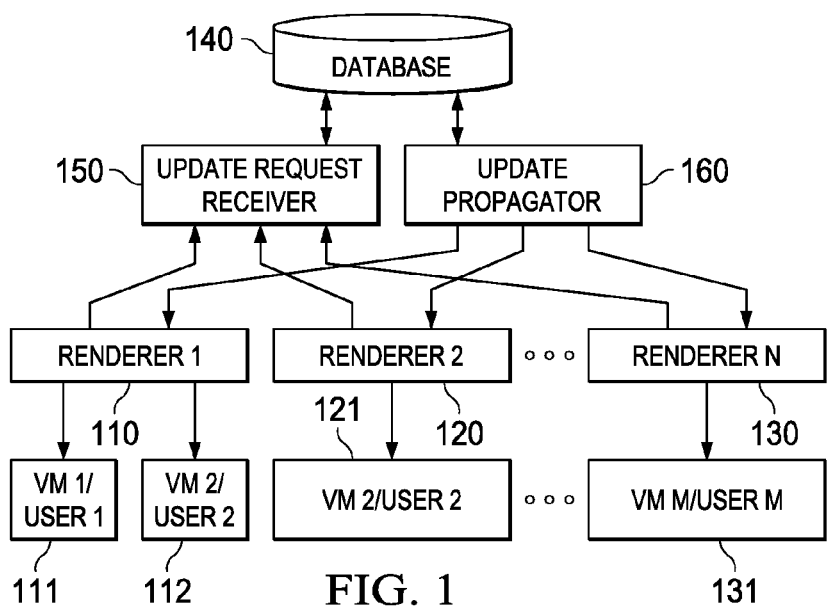
FIG. 1 is a block diagram of one embodiment of a multi-user, multi-scene environment including one embodiment of a system for propagating scene information to renderers therein.

As stated above, in cloud architectures, graphics content is rendered on a server and then encoded, packetized and transmitted over a network to a client as a video stream. In a multi-user, multi-scene cloud environment, multiple renderers are responsible for performing the rendering, often of multiple scenes, for the benefit of multiple users. As stated above, a cloud architecture is able to accommodate a variety of client platforms. Accordingly, the multiple renderers adapt their operation to accommodate their respective clients, and thus some renderers render frames at higher rates and resolutions than others. Further, some users may interrupt their interaction in the environment (such as when an artist takes a break and allows her client to go inactive or a gamer overtly pauses a game). Accordingly, their respective renderers pause their operation, only to resume later.

All of this bears on the issue of propagating application data to the renderers. As those skilled in the art are aware, multi-user, multi-scene applications build and modify, through a series of transformations, a three-dimensional (3D) "world" of geometric objects having physical attributes and locations relative to one another. The objects include light sources that illuminate other objects and cameras that offer views of other objects constituting the scenes that are to be rendered.

A graph, usually taking the form of a DAG, is the data structure of choice to represent this world, all of the objects (including their attributes and locations) that constitute it and the relationships (including dependencies and inheritances) and transformations among the objects. Structurally, a graph is a collection of nodes representing the objects and transformations that are joined together by edges. In a DAG, the edges are directed, each edge being a one-way path from one node to another and representing a dependency between the two nodes. A DAG is acyclic in that it is impossible to leave a node, circulate about the DAG (obeying the edge directions) and return to the same node. The import of being acyclic is that no object is dependent upon itself.

In a multi-user, multi-scene environment, the application maintains a graph, which may be considered the master. However, each renderer maintains a local version of the graph for the purpose of performing its rendering. The local versions of the graph usually contain or reflect only that part of the master graph relevant to the rendering that the renderer is to perform. The local versions of the graph need to be synchronized with the master graph.

As those skilled in the art are aware, the conventional technique for updating local graph versions with scene information is to broadcast changes in the master graph as they occur to each of the renderers to ensure that their local graph versions remain synchronized. Thus, changes in the master graph are broadcast, and each local version of the graph is updated, whenever the application changes the scene information in the master graph. This conventional technique may be thought of as a "push" model for propagating master graph changes to the local graph versions.

However, it is realized herein that an issue arises with respect to renderers that are not in immediate need of an up-to-date local version of the graph. Renderers falling in this category include those rendering at relatively low frame rates and those whose outputs are paused (either overtly or by inactivity). The issue is that the renderers not immediately needing an updated local graph version must nonetheless receive every change being broadcast and update their local graph versions. No opportunity exists to allow those renderers to be temporarily inactive and save power and processor bandwidth.

A conventional approach to solving this issue would be to broadcast the entire master graph and thereby synchronize the local graph versions. Unfortunately, this would have to be done every time the master graph changes, and significant bandwidth would be consumed. In addition, time constraints mandate that updates should propagate quickly. Broadcasting and re-processing the entire master graph is unacceptable in this context.

It is realized herein that a mechanism should exist whereby renderers can request changes made to the master graph while they were temporarily inactive and whereby the renderers are sent the changes in scene information they need to bring their local graph versions up-to-date. It is further realized herein that a mechanism should exist whereby the extent to which a particular local graph version needs to be updated can be determined, and an appropriate change list formed for transmission to the corresponding renderer. It is still further realized herein that this amounts to a "pull" model for propagating master graph changes to the local graph versions.

Accordingly, introduced herein are a system and method for propagating scene information to renderers in a multi-user, multi-scene environment. In various embodiments, the system and method provide a mechanism by which a renderer can generate an update request, a point from which the renderer is to be updated can be determined, a change list corresponding to the update request can be generated using the master graph and the change list transmitted to the renderer to allow the renderer to update the local version of the graph.

FIG. 1 is a block diagram of one embodiment of a multi-user, multi-scene environment including one embodiment of a system for propagating scene information to renderers therein. A plurality of renderers, including renderer 1 110, renderer 2 120 and renderer N 130 are operable to render video streams using respective local versions of a master graph, which may be a DAG. Each of the plurality of renderers 110, 120, 130 is associated with at least one particular virtual machine (VM) associated, in turn with a particular user. FIG. 1 allows M users; M may or may not equal N. In the example of FIG. 1, the renderer 1 110 is associated with two VMs: a VM 1/user 1 111 and a VM 2/user 2 112. The renderer 2 120 is associated with a single VM 2/user 2 121. The renderer M 130 is likewise associated with a single VM M/user M 131.

The illustrated embodiment of the system includes a database 140. The illustrated embodiment of the database 140 is operable to store a master graph containing scene information. In the illustrated embodiment, the master graph takes the form of a master DAG. The illustrated embodiment of the database 140 is further operable to contain a data structure, which may take the form of a registry, in which the various renderers 110, 120, 130 are registered, along with points indicating the states of the local graph versions associated with each of the renderers 110, 120, 130.

In one embodiment, the points indicate (e.g., by way of timestamps) the last times at which the local graph versions were updated. In an alternative embodiment, the local graph versions identify (e.g., by way of master graph transaction numbers or local graph version update numbers) the last update provided to the local graph versions. Those skilled in the pertinent art will understand that several different types of indicators may be employed to indicate the currency of each of the local graph versions.

The illustrated embodiment of the system further includes an update request receiver 150 associated with the database 140. In one embodiment, the update request receiver 150 is operable to receive update requests from the renderers 110, 120, 130 and determine points from which the respective local versions of the master graph are to be updated. In one embodiment, the update request receiver 150, upon receiving an update request from a particular renderer (e.g., the renderer 110) is operable to query the database 140 and retrieve the point from which the local graph version associated with the renderer making the update request is to be updated. Having retrieved the point, a change list may now be constructed for the particular local graph version.

The illustrated embodiment of the system yet further includes an update propagator 160 associated with the update request receiver 150. In the illustrated embodiment, the update propagator 160 is operable to employ the master graph (e.g., stored in the database 140) to construct a change list customized for the particular local graph version associated with the renderer that made the update request. Accordingly, in one embodiment, the update propagator 160 is operable to retrieve transactions made with respect to the master graph that occurred after the point from which the local version of the master graph is to be updated and construct the change list from the retrieved transactions. In an alternative embodiment, the update propagator 160 is operable to parse the master graph and determine what changes need to be made to the local graph version to conform it to the master graph. In either embodiment, a change list is generated.

In one embodiment, the change list identifies the objects in the local graph version that need to be updated and the update that needs to be applied to each object. In one embodiment, the master graph identifies each object by a unique number, and the change list uses the same unique number to identify each object that needs to be updated. In the illustrated embodiment, the objects are leaves of the master graph, and the unique numbers identify each distinct path from the root to a leaf of the master graph. Changes in any of the nodes on this path influence the data in the leaf after inheritance.

Figure 2:
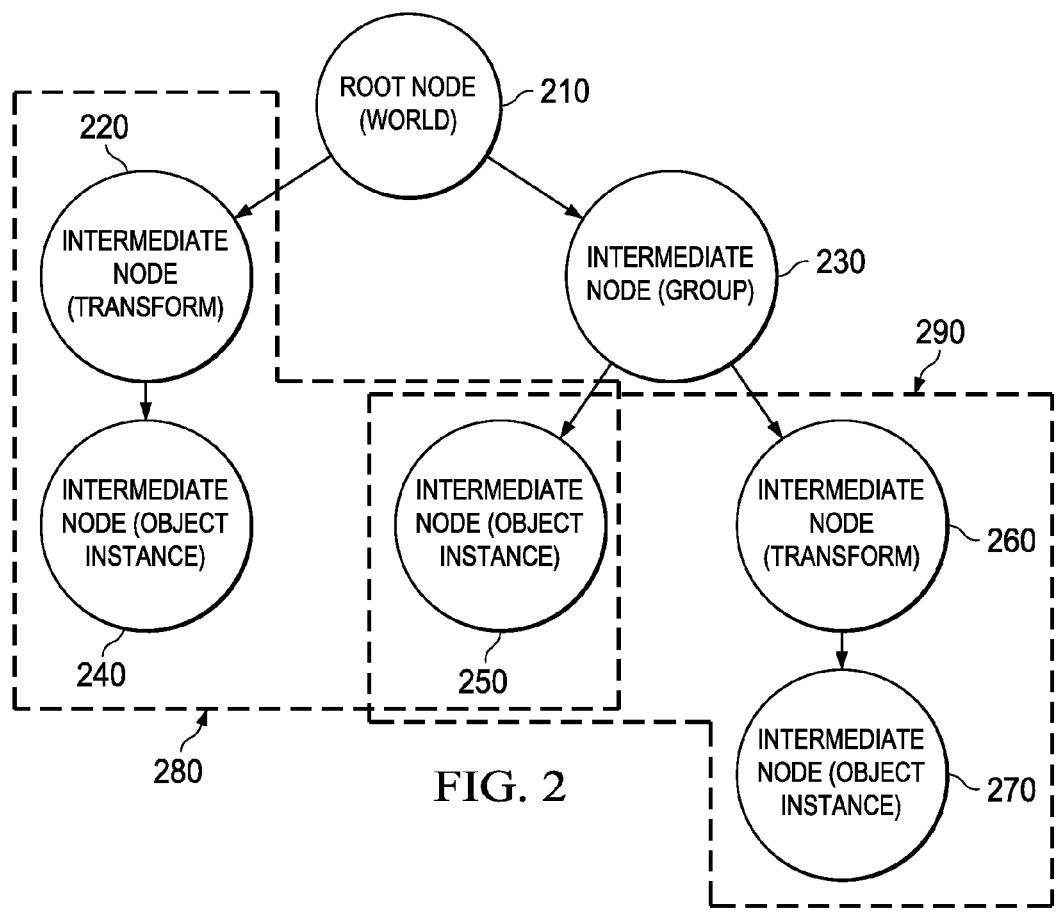
FIG. 2 is a diagram of one example of a graph that may be employed to contain scene information.

FIG. 2 is a diagram of one example of a graph that may be employed to contain scene information. FIG. 2 is presented primarily for the purpose of illustrating how portions of a master graph may be updated by an application over time, and how those updated portions may be employed to construct change lists for renderers.

The master graph of FIG. 2 happens to be a DAG and includes a root node 210 and several intermediate nodes 220, 230, 240, 250, 260, 270. The intermediate node 230 represents a group of objects. The intermediate nodes 240, 250, 270 represent instances of objects. The intermediate nodes 220, 260 represent transformations. The nodes 240, 250, 270 are leaf nodes. Those skilled in the pertinent art are familiar with graphs in general and DAGs in particular and understand that actual implementations of such graphs and DAGs are likely to have many thousands, and perhaps millions, of nodes. Assuming that an application is continually updating the graph as users are interacting with the application, the graph of FIG. 2 changes over time, resulting in nodes and edges being added and deleted.

An embodiment of the novel method introduced herein will now be set forth using two examples. In a first example, it is assumed that the update request receiver 150 of FIG. 1 has received an update request from a particular renderer (e.g., the renderer 120 of FIG. 1). After the update request receiver 150 has determined the point from which the local graph version associated with the renderer is to be updated, the update propagator 160 of FIG. 1 determines that three nodes 220, 240, 250 and lying within an area 280 have been updated since the point. Accordingly, the update propagator 160 of FIG. 1 generates a change list for the particular local graph version based on the updates lying in the area 280.

In a second example, it is assumed that the update request receiver 150 of FIG. 1 has received an update request from a particular renderer (e.g., the renderer 130 of FIG. 1). After the update request receiver 150 has determined the point from which the local graph version associated with the renderer is to be updated, the update propagator 160 of FIG. 1 determines that three nodes 250, 260, 270 and lying within an area 290 have been updated (either directly or by inheritance) since the point. Accordingly, the update propagator 160 of FIG. 1 generates a change list for the particular local graph version based on the updates lying in the area 290. It is important to note that the points in the first and second examples differ from one another, and, accordingly, the areas 280, 290 differ from one another.

In one embodiment, the entire graph forms the basis for a change list transmitted to a particular renderer. This might be the case were a substantial amount of time to have passed since the particular renderer updated its associated local graph version, i.e., the local graph version is grossly out-of-date. This is considered an extreme example.

Returning to FIG. 1, the illustrated embodiment will now be described in greater detail. In the illustrated embodiment, the database 140 takes the form of a key-value store, allowing storing and retrieving of database elements, with multi-user capabilities meaning that several versions of the data may exist concurrently. Scopes, which are similar to namespaces, are employed to regulate the visibility of data. Transactions are employed to enable parallelism and define the visibility of changes in time. Scopes can be nested to define a hierarchy.

To generate the change list, the illustrated embodiment of the update request receiver 150 is operable collects bit-arrays per version of a database element from the database 140, the type of changes that are applied to each database element to be tracked. The illustrated embodiment of the database 140 is operable to provide a query-functionality which collects a set of database element identifiers, or tags, together with the changes that have been applied to the tags in the range of a starting transaction to the current transaction and tied to a current scope and all visible parent scopes. This combination of tags and changes may be regarded as a journal. The underlying semantics of the bit-array can be arbitrarily precise, going from any general change on the element to a single field change, such as a change in camera resolution.

The illustrated embodiment allows, for each scene (and each scope, if there are differences in scope), an efficient, traversable tree-representation of the scene together with a map from all input database elements to the nodes. This representation is used to update the scene graph frequently and efficiently based on the journal. For each tag in the journal, the corresponding tree-node may be retrieved and propagated with the bit-flags in the graph, collecting all flags for, and updating the leaf nodes (e.g., cached data).

In the illustrated embodiment, the same mechanism is used to generate the change lists for the renderers in an asynchronous manner. For each change-list sequence, an extended time-stamp is stored per scene and per scope, allowing the starting transaction (the point) for the next change-list that should be generated as well as any desired topology update information. The journal is queried for the range of the starting transaction to the current transaction and used as described above to generate the bit flags for the changed leaf nodes. For topology changes, a different mechanism is needed in the illustrated embodiment because, in this context, it is not possible to compare the former and the new topology of the graph, as the former topology information is no longer visible in the current transaction and may be long outdated. Accordingly, the topology update information is generated as follows: an "is-known" flag is stored in the scene for each leaf node and for all currently existing change-list sequences. If a topology change has occurred, resulting in the leaf node being deleted or replaced, the 'is-known' flag is set to false for all currently existing change-list sequences by the synchronous update mechanism mentioned above. During the next change-list-generation, an "is-known" flag that is false means that topology changes occurred for this leaf node, prompting a check to determine whether or not the leaf node has been replaced or deleted by checking the current version of the leaf node. Newly added leaf nodes can be detected by comparing the size of the flag array to the current number of leaf nodes.

The illustrated embodiment of the update propagator 160 is further operable to transmit the change list toward the renderer that made the update request. In a more specific embodiment, the renderer that made the update request is operable to receive and apply the change list to its local graph version to update the same. The renderer is then operable to employ the updated local graph version to perform rendering for its corresponding VM and user.

Figure 3:
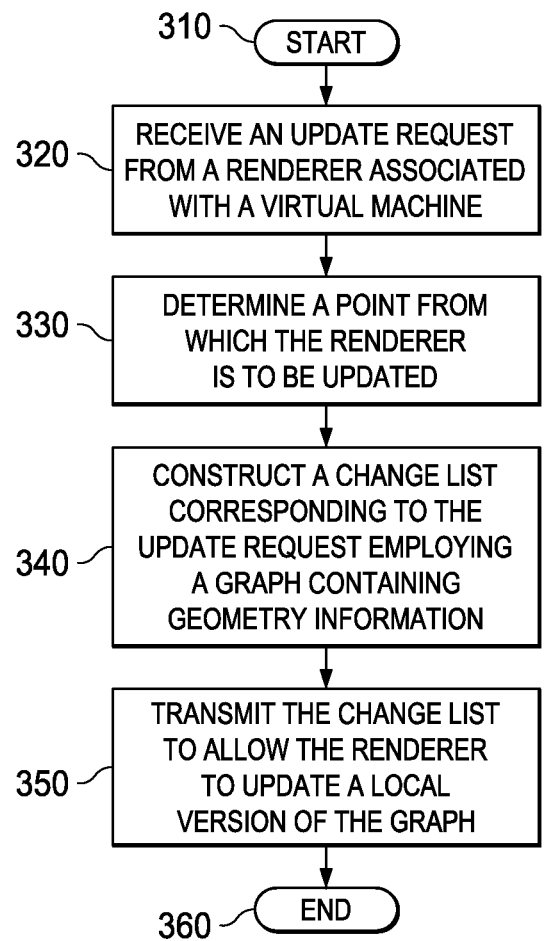
FIG. 3 is a flow diagram of one embodiment of a method of propagating scene information to renderers in a multi-user, multi-scene environment.

FIG. 3 is a flow diagram of one embodiment of a method of propagating scene information to renderers in a multi-user, multi-scene environment. The method begins in a start step 310. In a step 320, an update request is received from a renderer associated with a virtual machine. In a step 330, a point from which the renderer is to be updated is determined. In a step 340, a change list corresponding to the update request is constructed employing a graph containing scene information. In a step 350, the change list is transmitted toward the renderer to allow the renderer to update a local version of the graph. The method ends in an end step 360.

Those skilled in the art to which this application relates will appreciate that other and further additions, deletions, substitutions and modifications may be made to the described embodiments.

What is claimed is:

1. A system for propagating scene information to a renderer, comprising:
an update request receiver operable to receive update requests from said renderer and determine a point from which said renderer is to be updated, wherein said update requests include requests for changes made to said scene information while said renderer was inactive; and
an update propagator associated with said update request receiver and operable to employ a graph containing scene information to construct a change list in response to said update request and transmit said change list toward said renderer, said system and renderer implemented on a cloud server.

2. The system as recited in claim 1 wherein said renderer is associated with at least one virtual machine corresponding to a user.

3. The system as recited in claim 1 wherein said graph is a directed acyclic graph containing nodes selected from the group consisting of:
transformations,
object groups, and
object instances.

4. The system as recited in claim 1 wherein said change list identifies objects and corresponding object changes.

5. The system as recited in claim 1 wherein said renderer is registered in a database associated with said update request receiver, said database including said point.

6. The system as recited in claim 1 wherein said update propagator is further configured to generate a tree by unfolding said graph and construct said change list from said tree.

7. The system as recited in claim 1 wherein said renderer is configured to generate a video stream using said change list, said video stream transmitted from said cloud server to a client platform.

8. A method of propagating scene information to a renderer in a multi-user, multi-scene environment, comprising:
receiving an update request from a renderer associated with a virtual machine, wherein said update request includes a request for changes made to said scene information while said renderer was inactive;
determining a point from which said renderer is to be updated;
constructing a change list in response to said update request employing a graph containing scene information; and
transmitting said change list to allow said renderer to update a local version of said graph, wherein said receiving, determining, constructing, and transmitting are performed on a cloud server.

9. The method as recited in claim 8 wherein said renderer is associated with at least one virtual machine corresponding to a user.

10. The method as recited in claim 8 wherein said graph is a directed acyclic graph containing nodes selected from the group consisting of:
transformations,
object groups, and
object instances.

11. The method as recited in claim 8 wherein said change lists identify objects and corresponding object changes.

12. The method as recited in claim 8 wherein said renderer is registered in a database, said database including said point.

13. The method as recited in claim 8 further comprising generating trees by unfolding said graph and constructing said change lists from said trees.

14. The method as recited in claim 8 wherein said renderer is configured to generate video streams using said change lists, said video stream transmitted from said cloud server to a client platform.

15. A multi-user, multi-scene system, comprising:
a database operable to store a master Directed Acyclic Graph (DAG) containing scene information;
a plurality of renderers operable to render video streams using respective local versions of said master DAG;
an update request receiver associated with said database and operable to receive update requests from said renderers and determine points from which said respective local versions of said master DAG are to be updated, wherein said update requests include requests for changes made to said master DAG while said renderer was inactive; and
an update propagator associated with said update request receiver and operable to employ said master DAG to construct change lists in response to said update requests and transmit said change lists to said renderers, said multi-user, multi-scene system implemented on a cloud server.

16. The system as recited in claim 15 wherein each of said renderers is associated with at least one virtual machine corresponding to a user.

17. The system as recited in claim 15 wherein said master DAG contains nodes selected from the group consisting of:
transformations,
object groups, and
object instances.

18. The system as recited in claim 15 wherein said change lists identify objects and corresponding object changes.

19. The system as recited in claim 15 wherein said database includes said points.

20. The system as recited in claim 15 wherein said update propagator is further configured to generate trees by unfolding said graph and construct said change lists from said trees.

* * * * *